(12) United States Patent
Cao et al.

(10) Patent No.: US 11,784,380 B2
(45) Date of Patent: Oct. 10, 2023

(54) BATTERY MODULE

(71) Applicant: CONTEMPORARY AMPEREX TECHNOLOGY CO., LIMITED, Ningde (CN)

(72) Inventors: Gen Cao, Ningde (CN); Jihua Yao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 400 days.

(21) Appl. No.: 17/316,533

(22) Filed: May 10, 2021

(65) Prior Publication Data

US 2021/0265712 A1 Aug. 26, 2021

Related U.S. Application Data

(63) Continuation of application No. PCT/CN2019/091349, filed on Jun. 14, 2019.

(30) Foreign Application Priority Data

Nov. 23, 2018 (CN) .......................... 201821946727.9

(51) Int. Cl.
*H01M 50/593* (2021.01)
*H01M 50/209* (2021.01)
*H01M 50/291* (2021.01)

(52) U.S. Cl.
CPC ....... *H01M 50/593* (2021.01); *H01M 50/209* (2021.01); *H01M 50/291* (2021.01)

(58) Field of Classification Search
CPC ... Y02E 60/10; H01M 50/593; H01M 50/209; H01M 50/291; H01M 50/262; H01M 50/289
See application file for complete search history.

(56) References Cited

U.S. PATENT DOCUMENTS

2015/0024253 A1\* 1/2015 Noh .................... H01M 50/209
429/156

FOREIGN PATENT DOCUMENTS

| CN | 203631621 U | 6/2014 |
| CN | 204809283 U | 11/2015 |

(Continued)

OTHER PUBLICATIONS

Contemporary Amperex Technology Co., Limited, International Search Report and Written Opinion, PCT/CN2019/091349, dated Sep. 19, 2019, 12 pgs.

(Continued)

*Primary Examiner* — Kiran Quraishi Akhtar
(74) *Attorney, Agent, or Firm* — Kilpatrick Townsend & Stockton LLP

(57) ABSTRACT

This application provides a battery module. The battery module includes: a plurality of batteries, arranged sequentially along a thickness direction of the battery module, where a gap exists between every two adjacent batteries; and a first side plate, disposed on one side of the plurality of batteries in a width direction of the battery module. A plurality of notches and a plurality of flanges are formed on the first side plate. Each notch corresponds to a location of the gap between every two adjacent batteries. Each flange bends from one side of a corresponding notch and extends into the corresponding gap between the two adjacent batteries to separate the two adjacent batteries.

7 Claims, 9 Drawing Sheets

(56) References Cited

FOREIGN PATENT DOCUMENTS

| | | |
|---|---|---|
| CN | 106299188 A | 1/2017 |
| CN | 107672435 A | 2/2018 |
| CN | 207967119 U | 10/2018 |
| EP | 0952620 A1 | 10/1999 |
| EP | 3367461 A1 | 8/2018 |
| JP | 2018129240 A | 8/2018 |

OTHER PUBLICATIONS

Contemporary Amperex Technology Co., Limited, Extended European Search Report, EP19887156.8, dated Nov. 11, 2021, 6 pgs.

* cited by examiner

BATTERY MODULE

CROSS-REFERENCE TO RELATED APPLICATIONS

This application is a continuation application of PCT Patent Application No. PCT/CN2019/091349, entitled "BATTERY MODULE" filed on Jun. 14, 2019, which claims priority to Chinese Patent Application No. 201821946727.9, entitled "BATTERY MODULE" filed on Nov. 23, 2018 and entitled "BATTERY MODULE", all of which are incorporated herein by reference in their entirety.

TECHNICAL FIELD

This application relates to the field of secondary batteries, and in particular, to a battery module.

BACKGROUND

In the design of battery modules currently, when batteries combine into a battery module, some cushions are used to achieve purposes of: adjusting a length of the battery module through elastic deformation of the cushions to ensure that the batteries can be normally assembled with side plates and end plates; and forming a gap between two adjacent batteries, reserving a space for expansion of the batteries, reducing an expansion force of the batteries, reducing a risk of a battery plunge, and controlling a cycle expansion length of the battery module. However, the existing cushion-based solution has some disadvantages. A thickness of a cushion itself reduces the space for the expansion of the batteries. The assembly and fixation between the cushion and the battery need to allow for gluing, positioning, and the like, thereby making an assembly process more difficult. The added cushions increase manufacturing cost of the battery module.

SUMMARY

In view of disadvantages in existing technologies, an objective of this application is to provide a battery module to reserve more space for expansion of a battery, simplify an assembly process of the battery module, and reduce costs.

To achieve the foregoing objective, this application provides a battery module, including a plurality of batteries, arranged sequentially along a thickness direction of the battery module, where a gap exists between every two adjacent batteries; and a first side plate, disposed on one side of the plurality of batteries in a width direction of the battery module. A plurality of notches and a plurality of flanges are formed on the first side plate. Each notch corresponds to a location of the gap between every two adjacent batteries. Each flange bends from one side of a corresponding notch and extends into the corresponding gap between the two adjacent batteries to separate the two adjacent batteries.

In an embodiment, the first side plate includes a plate body and an upper bending portion. The upper bending portion bends from an upper side of the plate body toward the plurality of batteries along the width direction. The upper bending portion is located on an upper side of the plurality of batteries in a height direction of the battery module. A plurality of notches and a plurality of flanges are formed on the upper bending portion. Each notch of the upper bending portion corresponds to the location of the gap between every two adjacent batteries. Each flange of the upper bending portion bends downward from a thickness-wise side edge of a corresponding notch.

In an embodiment, the first side plate includes a plate body and a lower bending portion. The lower bending portion bends from a lower side of the plate body toward the plurality of batteries along the width direction. The lower bending portion is located on a lower side of the plurality of batteries in a height direction of the battery module. A plurality of notches and a plurality of flanges are formed on the lower bending portion. Each notch of the lower bending portion corresponds to the location of the gap between every two adjacent batteries. Each flange of the lower bending portion bends upward from a thickness-wise side edge of a corresponding notch.

In an embodiment, the first side plate includes a plate body. A plurality of notches and a plurality of flanges are formed on at least one of an upper side, a lower side, or a position between the upper side and the lower side of the plate body in the height direction. Each notch on at least one of the upper side, the lower side, or the position between the upper side and the lower side of the plate body in the height direction corresponds to the location of the gap between every two adjacent batteries. Each flange at the corresponding position bends from a thickness-wise side edge of a corresponding notch toward the plurality of batteries along the width direction.

In an embodiment, a thickness of the first side plate is smaller than a width of the gap between two adjacent batteries.

In an embodiment, a bulging rib that bulges in the thickness direction is formed on each flange.

In an embodiment, the bulging rib is parallel to the thickness-wise side edge of the corresponding notch.

In an embodiment, a plurality of notches and a plurality of flanges are formed on an upper side and a lower side of the first side plate separately in the height direction. A bulging direction of the bulging rib on each flange on the upper side of the first side plate in the height direction is opposite to a bulging direction of the bulging rib on each flange on the lower side of the first side plate in the height direction.

In an embodiment, the battery module further includes a second side plate. The second side plate adopts a structure of the first side plate described above.

In an embodiment, a shape of the second side plate is identical to that of the first side plate.

Beneficial effects of this application are as follows:

In the battery module according to this application, two adjacent batteries are separated by a plurality of notches and a plurality of flanges formed on the first side plate, thereby reserving more space for expansion of each battery, simplifying an assembly process of the battery module, and reducing costs.

Figure 1:
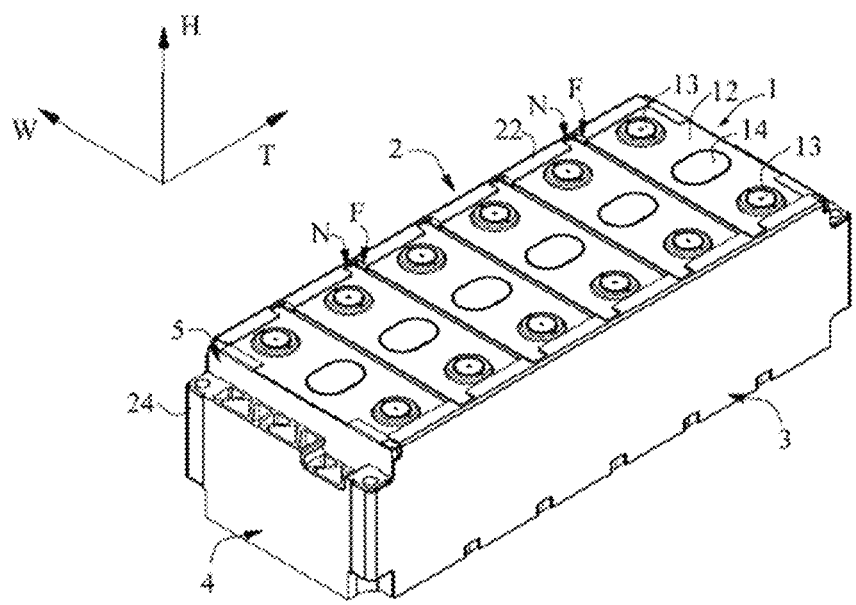
FIG. 1 is a three-dimensional view of a battery module according to a first embodiment of this application.

Reference numerals are as follows:

1: Battery;
11: Housing;
111: Major face;
112: Minor side face;
12: Top cover;
13: Electrode post
14: Explosion-proof valve
2: First side plate;
21: Plate body;
22: Upper bending portion;
23: Lower bending portion;
24: End bending portion;
3. Second side plate;
4: End plate;
5: Insulation shield;
N: Notch;
N1: Thickness-wise side edge;
F: Flange;
F1: Bulging rib;
T: Thickness direction;
W: Width direction; and
H: Height direction

DETAILED DESCRIPTION OF EMBODIMENTS

The accompanying drawings show embodiments of this application. Understandably, the disclosed embodiments are merely examples of this application, and this application may be implemented in various forms. Therefore, the details disclosed herein are not to be interpreted as a limitation, but are merely as a basis of the claims and as a representative basis for teaching one skilled in the art to variously implement this application.

Figure 2:
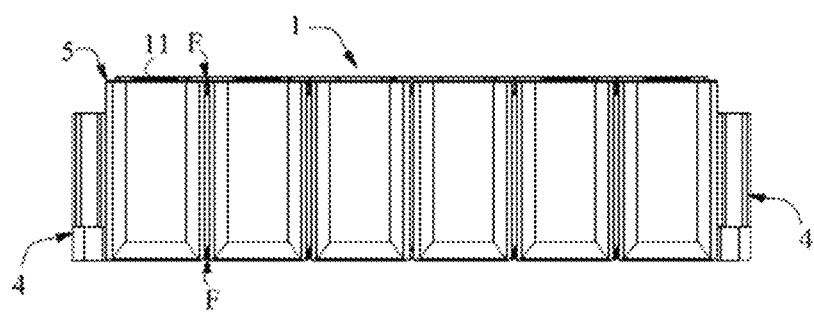
FIG. 2 is a sectional view of the battery module shown in FIG. 1 sectioned along a thickness direction of the battery module.
Figure 3:
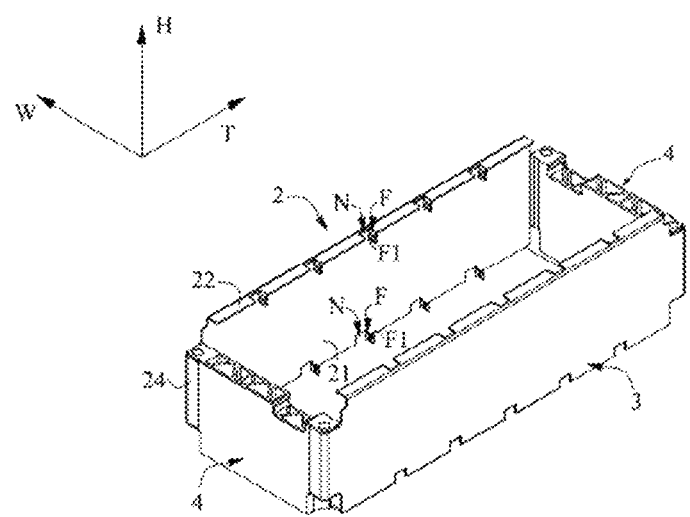
FIG. 3 is a three-dimensional assembly diagram of a first side plate, a second side plate, and end plates of the battery module shown in FIG. 1.
Figure 4:
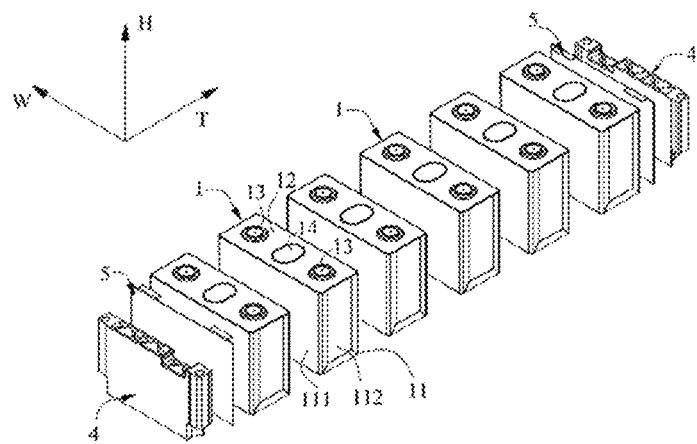
FIG. 4 is a three-dimensional exploded view of a plurality of batteries, insulation shields, and end plates of the battery module shown in FIG. 1.

FIG. 1 is a three-dimensional view of a battery module according to a first embodiment of this application; FIG. 2 is a sectional view of the battery module shown in FIG. 1 sectioned along a thickness direction of the battery module; FIG. 3 is a three-dimensional assembly diagram of a first side plate, a second side plate, and end plates of the battery module shown in FIG. 1; and FIG. 4 is a three-dimensional exploded view of a plurality of batteries, insulation shields, and end plates of the battery module shown in FIG. 1.

The battery module according to this application includes: a plurality of batteries 1, arranged sequentially along a thickness direction T of the battery module, where a gap exists between every two adjacent batteries 1; and a first side plate (2), disposed on one side of the plurality of batteries 1 in a width direction of the battery module. The battery module further includes: a second side plate 3; and an end plate 4, disposed at either end of the plurality of batteries 1 in the thickness direction T; and an insulation shield 5, disposed between the end plate 4 and a battery 1 located at either end of the plurality of batteries 1, and configured to insulate and protect an conductive part (such as main output electrodes (a main positive electrode and main negative electrode)) of the battery module) in the battery module and corresponding electrical connection parts (such as connectors and wires).

The battery 1 is a hard-case battery (or called a can-shaped battery), and includes an electrode assembly (not shown), a housing 11, a top cover 12, an electrode post 13, and an explosion-proof valve 14. The housing 11 includes major faces 111 and minor side faces 112. An accommodation cavity is formed inside the housing 11 to accommodate the electrode assembly and an electrolytic solution. The electrode assembly includes a positive electrode plate, a negative electrode plate, and a separator that separates the positive electrode plate from the negative electrode plate. The electrode assembly may be formed by winding the positive electrode plate, the negative electrode plate, and the separator, or by stacking the positive electrode plate, the negative electrode plate, and the separator. The positive electrode plate and the negative electrode plate each include a current collector and an active substance layer disposed on the current collector.

The first side plate 2 is made of a metal material to improve strength. A plurality of notches N and a plurality of flanges F are formed on the first side plate 2. Each notch N corresponds to a location of the gap between every two adjacent batteries 1, and each flange F bends from one side of a corresponding notch N and extends into the corresponding gap between the two adjacent batteries 1 to separate the two adjacent batteries 1 and limit the position of each battery 1. Each notch N is formed by cutting a part of the first side plate 2 and bending the part. A size of each flange F is up to a size of a single battery 1 in the width direction W, and is optionally ¼ of the size of a single battery 1 in the width direction W to ensure connection strength of the flange and avoid occupying the space for expansion of the major face 111 of the housing 11 of the battery 1.

A disposition manner of the plurality of notches N and the plurality of flanges F varies depending on the structure of the first side plate 2.

Figure 5:
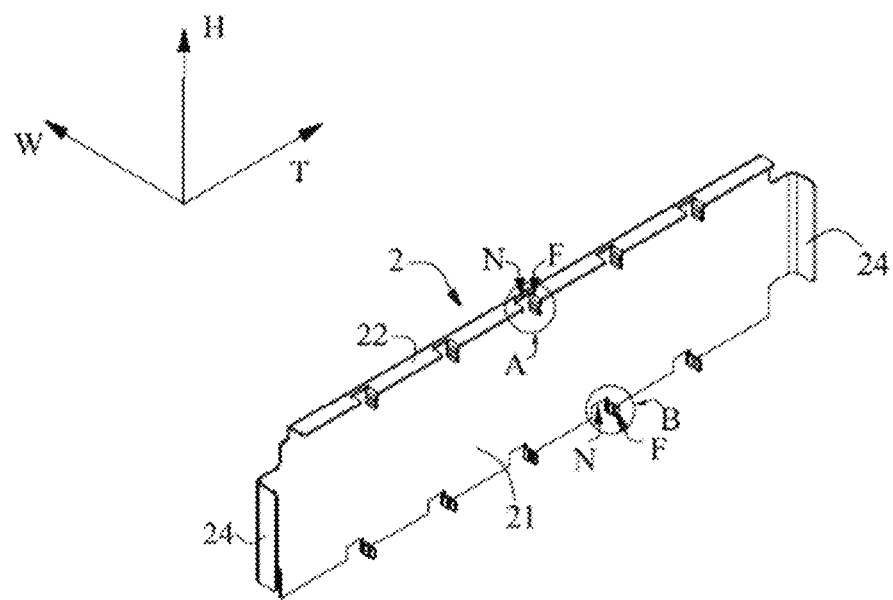
FIG. 5 is a three-dimensional view of a first side plate of the battery module shown in FIG. 1 according to a first embodiment.
Figure 6:
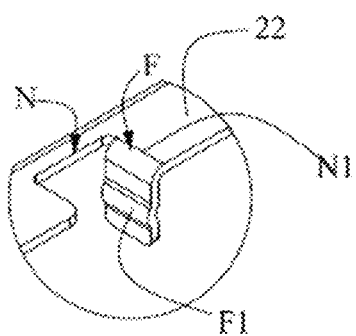
FIG. 6 is a local detailed three-dimensional view of a part A shown in FIG. 5.
Figure 7:
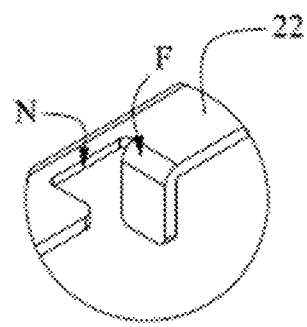
FIG. 7 is a local detailed three-dimensional view of a part A corresponding to FIG. 6, and shows another embodiment of a flange in the part A.
Figure 8:
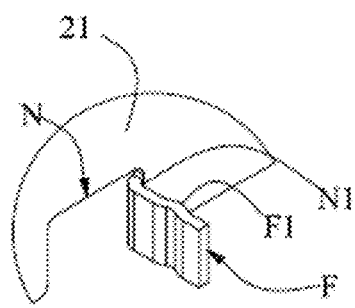
FIG. 8 is a local detailed three-dimensional view of a part B shown in FIG. 5.
Figure 9:
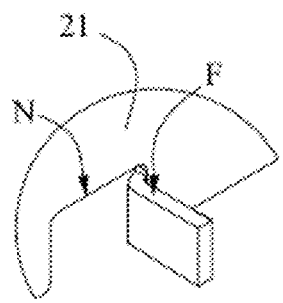
FIG. 9 is a local detailed three-dimensional view of a part B corresponding to FIG. 8, and shows another embodiment of a flange in the part B.

FIG. 5 is a three-dimensional view of a first side plate of the battery module shown in FIG. 1 according to a first embodiment; FIG. 6 is a local detailed three-dimensional view of a part A shown in FIG. 5; FIG. 7 is a local detailed three-dimensional view of a part A corresponding to FIG. 6, and shows another embodiment of a flange in the part A; FIG. 8 is a local detailed three-dimensional view of a part B shown in FIG. 5; FIG. 9 is a local detailed three-dimensional view of a part B corresponding to FIG. 8, and shows another embodiment of a flange in the part B; and FIG. 10 is a three-dimensional view of a first side plate of a battery module according to a second embodiment.

In the first embodiment and the second embodiment shown in FIG. 5 to FIG. 10, the first side plate 2 includes a plate body 21 and an upper bending portion 22. The upper bending portion 22 bends from an upper side of the plate body 21 toward the plurality of batteries 1 along the width direction W. The upper bending portion 22 is located on an upper side of the plurality of batteries 1 in a height direction H. A plurality of notches N and a plurality of flanges F are formed on the upper bending portion 22. Each notch N of the upper bending portion 22 corresponds to the location of the gap between every two adjacent batteries 1. Each flange F of the upper bending portion 22 bends downward from a thickness-wise side edge N1 of a corresponding notch N. The size of the upper bending portion 22 and size of the upper bending portion 22 in a fifth embodiment described later are appropriate as long as no interference with a most neighboring part (such as the electrode post 13) on the top cover 12 occurs.

Specifically, in the first embodiment shown in FIG. 5 to FIG. 9, a plurality of notches N and a plurality of flanges F are formed on the upper bending portion 22. In addition, a plurality of notches N and a plurality of flanges F are also formed on the lower side of the plate body 21 in the height direction H. Each notch N on the lower side of the plate body 21 in the height direction H corresponds to the location of the gap between every two adjacent batteries 1. Each flange F on the lower side of the plate body 21 in the height direction H bends from a thickness-wise side edge N1 of a corresponding notch N toward the plurality of batteries 1 along the width direction W. Nevertheless, a plurality of notches N and a plurality of flanges F may be formed not only on the lower side of the plate body 21 in the height direction H, but also between the upper bending portion 22 in the height direction H and the lower side of the plate body 21 (for example, may be formed in a middle part between the upper bending portion 22 in the height direction H and the lower side of the plate body 21). Each notch N between the upper bending portion 22 in the height direction H and the lower side of the plate body 21 corresponds to the location of the gap between every two adjacent batteries 1. Each flange F between the upper bending portion 22 in the height direction H and the lower side of the plate body 21 bends from a thickness-wise side edge N1 of a corresponding notch N toward the plurality of batteries 1 along the width direction W.

Figure 10:
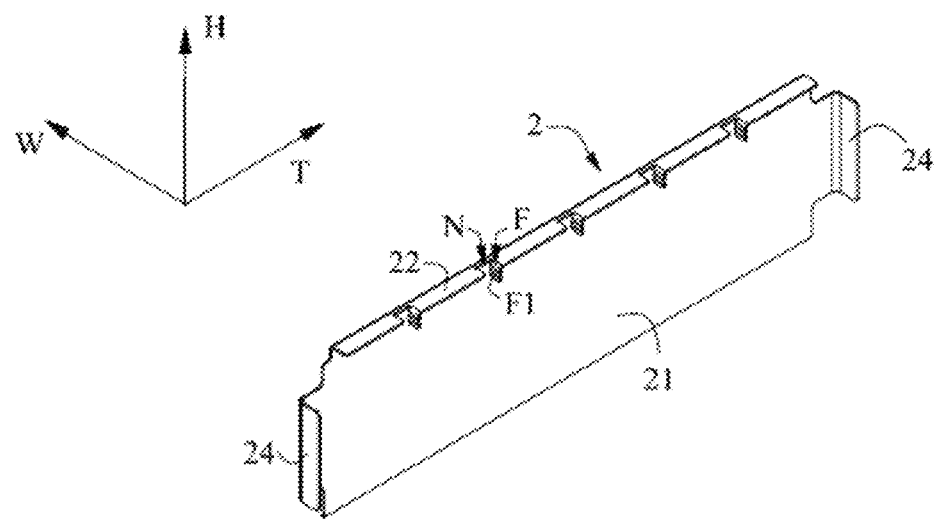
FIG. 10 is a three-dimensional view of a first side plate of a battery module according to a second embodiment.

Specifically, in the second embodiment shown in FIG. 10, a plurality of notches N and a plurality of flanges F are formed merely on the upper bending portion 22 of the first side plate 2.

Figure 11:
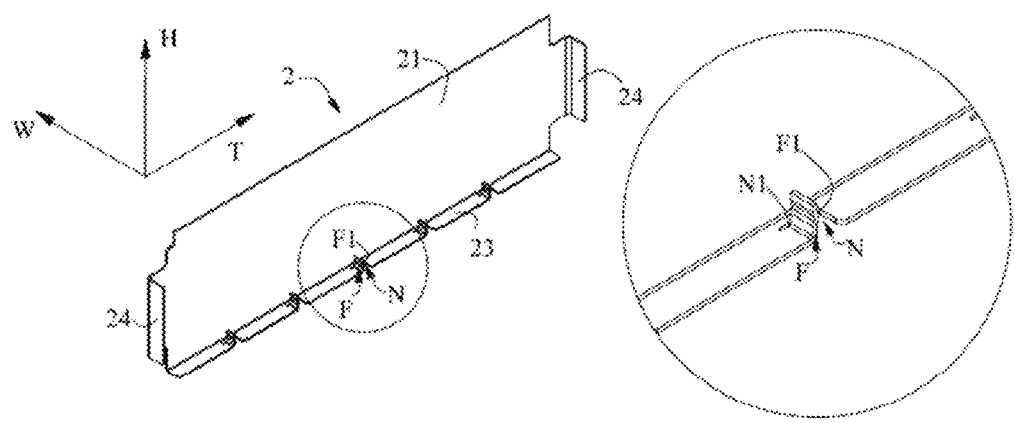
FIG. 11 is a three-dimensional view of a first side plate of a battery module according to a third embodiment.
Figure 12:
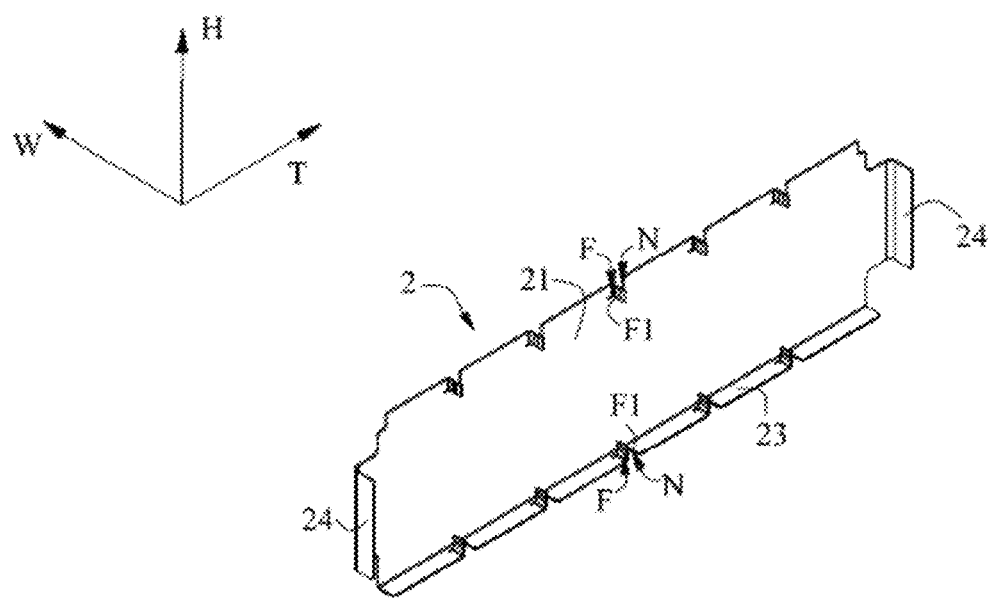
FIG. 12 is a three-dimensional view of a first side plate of a battery module according to a fourth embodiment.

FIG. 11 is a three-dimensional view of a first side plate of a battery module according to a third embodiment; and FIG. 12 is a three-dimensional view of a first side plate of a battery module according to a fourth embodiment.

In the third embodiment and the fourth embodiment shown in FIG. 11 and FIG. 12, the first side plate 2 includes a plate body 21 and a lower bending portion 23. The lower bending portion 23 bends from a lower side of the plate body 21 toward the plurality of batteries 1 along the width direction W. The lower bending portion 23 is located on a lower side of the plurality of batteries 1 in a height direction H. A plurality of notches N and a plurality of flanges F are formed on the lower bending portion 23. Each notch N of the lower bending portion 23 corresponds to the location of the gap between every two adjacent batteries 1. Each flange F of the lower bending portion 23 bends upward from a thickness-wise side edge N1 of a corresponding notch N.

Specifically, in the third embodiment shown in FIG. 11, a plurality of notches N and a plurality of flanges F are formed merely on the lower bending portion 23 of the first side plate 2.

Specifically, in the fourth embodiment shown in FIG. 12, a plurality of notches N and a plurality of flanges F are formed on the lower bending portion 23. In addition, a plurality of notches N and a plurality of flanges F are also formed on the upper side of the plate body 21 in the height direction H. Each notch N on the upper side of the plate body 21 in the height direction H corresponds to the location of the gap between every two adjacent batteries 1. Each flange F on the upper side of the plate body 21 in the height direction H bends from a thickness-wise side edge N1 of a corresponding notch N toward the plurality of batteries 1 along the width direction W. Nevertheless, a plurality of notches N and a plurality of flanges F may be formed not only on the upper side of the plate body 21 in the height direction H, but also between the lower bending portion 23 in the height direction H and the upper side of the plate body 21 (for example, may be formed in a middle part between the lower bending portion 23 in the height direction H and the upper side of the plate body 21). Each notch N between the lower bending portion 23 in the height direction H and the upper side of the plate body 21 corresponds to the location of the gap between every two adjacent batteries 1. Each flange F between the lower bending portion 23 in the height direction H and the upper side of the plate body 21 bends from a thickness-wise side edge N1 of a corresponding notch N toward the plurality of batteries 1 along the width direction W.

Figure 13:
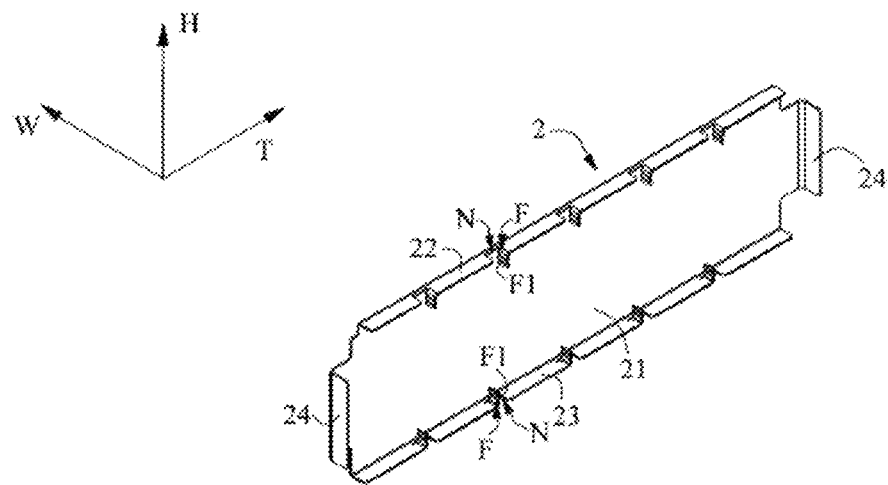
FIG. 13 is a three-dimensional view of a first side plate of a battery module according to a fifth embodiment.

FIG. 13 is a three-dimensional view of a first side plate of a battery module according to a fifth embodiment;

In the fifth embodiment shown in FIG. 13, the first side plate 2 includes a plate body 21, an upper bending portion 22, and a lower bending portion 23. The upper bending portion 22 bends from the upper side of the plate body 21 toward the plurality of batteries 1 along the width direction W. The upper bending portion 22 is located on the upper side of the plurality of batteries 1 in the height direction H. A plurality of notches N and a plurality of flanges F are formed on the upper bending portion 22. Each notch N of the upper bending portion 22 corresponds to the location of the gap between every two adjacent batteries 1. Each flange F of the upper bending portion 22 bends downward from a thickness-wise side edge N1 of a corresponding notch N. The lower bending portion 23 bends from the lower side of the plate body 21 toward the plurality of batteries 1 along the width direction W. The lower bending portion 23 is located on the lower side of the plurality of batteries 1 in the height direction H. A plurality of notches N and a plurality of flanges F are also formed on the lower bending portion 23. Each notch N of the lower bending portion 23 corresponds to the location of the gap between every two adjacent batteries 1. Each flange F of the lower bending portion 23 bends upward from a thickness-wise side edge N1 of a corresponding notch N of the lower bending portion 23. In addition, in other embodiments, a plurality of notches N and flanges F may be formed merely on the upper bending portion 22, or a plurality of notches N and flanges F may be formed merely on the lower bending portion 23. A plurality of notches N and flanges F may be formed merely on the upper bending portion 22, or merely on the lower bending portion 23, or on both the upper bending portion 22 and the lower bending portion 23, a plurality of notches N and flanges F are also formed between the upper bending portion 22 and the lower bending portion 23 in the height direction H. Each notch N between the upper bending portion 22 and the lower bending portion 23 in the height direction H corresponds to the location of the gap between every two adjacent batteries 1. Each flange F between the upper bending portion 22 and the lower bending portion 23 in the height direction H bends from a thickness-wise side edge N1 of a corresponding notch N toward the plurality of batteries 1 along the width direction W.

Figure 14:
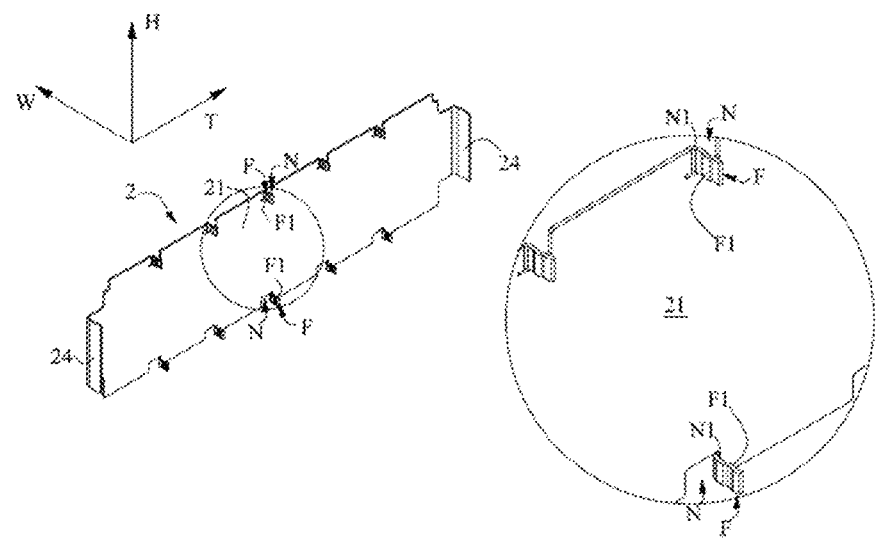
FIG. 14 is a three-dimensional view of a first side plate of a battery module according to a sixth embodiment.
Figure 15:
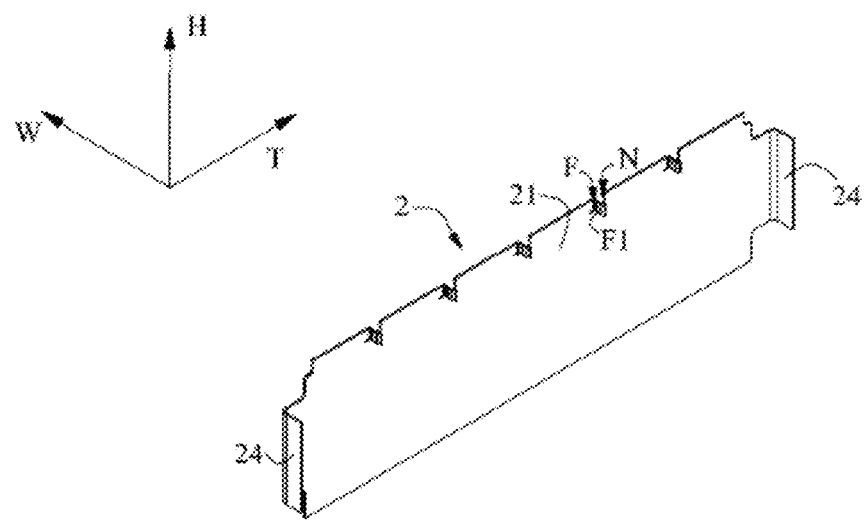
FIG. 15 is a three-dimensional view of a first side plate of a battery module according to a seventh embodiment.
Figure 16:
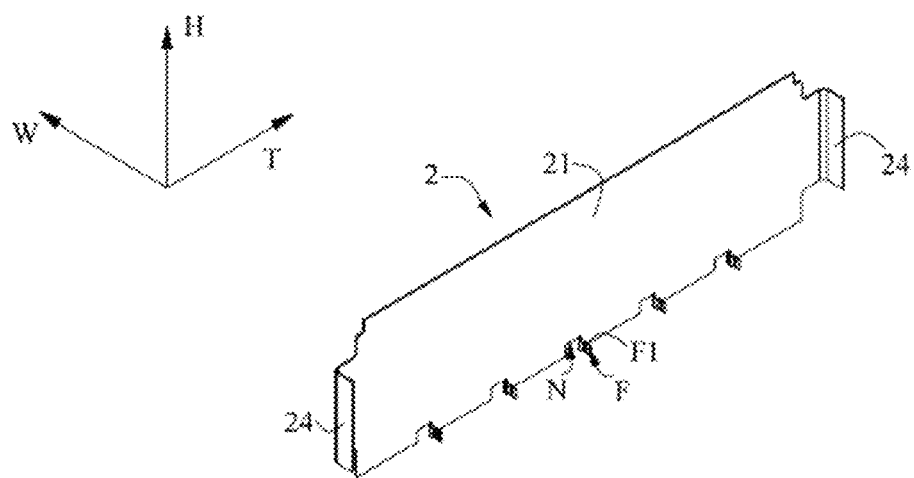
FIG. 16 is a three-dimensional view of a first side plate of a battery module according to an eighth embodiment.
Figure 17:
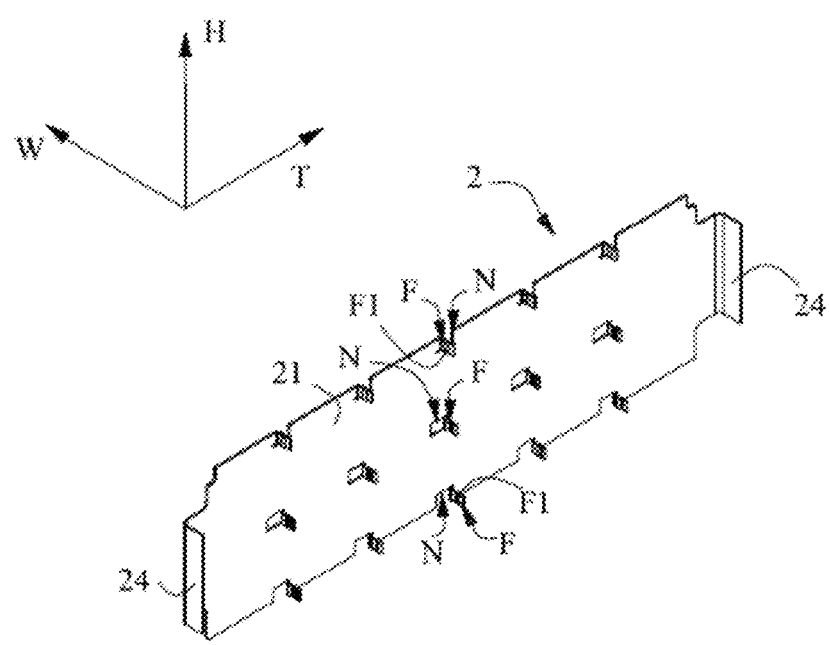
FIG. 17 is a three-dimensional view of a first side plate of a battery module according to a ninth embodiment.

FIG. 14 is a three-dimensional view of a first side plate of a battery module according to a sixth embodiment; FIG. 15 is a three-dimensional view of a first side plate of a battery module according to a seventh embodiment; FIG. 16 is a three-dimensional view of a first side plate of a battery module according to an eighth embodiment; and FIG. 17 is a three-dimensional view of a first side plate of a battery module according to a ninth embodiment.

In the sixth embodiment to the ninth embodiment shown in FIG. 14 to FIG. 17, the first side plate 2 includes neither the upper bending portion 22 nor the lower bending portion 23. Instead, the first side plate 2 includes a plate body 21. A plurality of notches N and a plurality of flanges F are formed on at least one of an upper side, a lower side, or a position between the upper side and the lower side of the plate body 21 in the height direction H. Each notch N on at least one of the upper side, the lower side, or the position between the upper side and the lower side of the plate body 21 in the height direction H corresponds to the location of the gap between every two adjacent batteries 1. Each flange F at the corresponding position bends from a thickness-wise side edge N1 of a corresponding notch N toward the plurality of batteries 1 along the width direction W. The positions at which the plurality of notches N and flanges F are formed may be determined according to actual needs.

Specifically, in the sixth embodiment shown in FIG. 14, the first side plate 2 includes a plate body 21. A plurality of notches N and flanges F are formed on both the upper side and the lower side of the plate body 21 in the height direction H. Each notch N on the upper side of the plate body 21 in the height direction H corresponds to the location of the gap between every two adjacent batteries 1. Each flange F on the upper side of the plate body 21 in the height direction H bends from a thickness-wise side edge N1 of a corresponding notch N toward the plurality of batteries 1 along the width direction W. In addition, each notch N on the lower side of the plate body 21 in the height direction H corresponds to the location of the gap between every two adjacent batteries 1. Each flange F on the lower side of the plate body 21 in the height direction H bends from a thickness-wise side edge N1 of a corresponding notch N toward the plurality of batteries 1 along the width direction W.

Specifically, in the seventh embodiment shown in FIG. 15, the first side plate 2 includes a plate body 21. A plurality of notches N and a plurality of flanges F are formed on the upper side of the plate body 21 in the height direction H. Each notch N on the upper side of the plate body 21 in the height direction H corresponds to the location of the gap between every two adjacent batteries 1. Each flange F on the upper side of the plate body 21 in the height direction H bends from a thickness-wise side edge N1 of a corresponding notch N toward the plurality of batteries 1 along the width direction W.

Specifically, in the eighth embodiment shown in FIG. 16, the first side plate 2 includes a plate body 21. A plurality of notches N and a plurality of flanges F are formed on the lower side of the plate body 21 in the height direction H. Each notch N on the lower side of the plate body 21 in the height direction H corresponds to the location of the gap between every two adjacent batteries 1. Each flange F on the lower side of the plate body 21 in the height direction H bends from a thickness-wise side edge N1 of a corresponding notch N toward the plurality of batteries 1 along the width direction W.

Specifically, in the ninth embodiment shown in FIG. 17, the first side plate 2 includes a plate body 21. A plurality of notches N and a plurality of flanges F are formed on the upper side and the lower side of the plate body 21 in the height direction H and in the middle part between the upper side and the lower side. Each notch N on the upper side of the plate body 21 in the height direction H corresponds to the location of the gap between every two adjacent batteries 1. Each flange F on the upper side of the plate body 21 in the height direction H bends from a thickness-wise side edge N1 of a corresponding notch N toward the plurality of batteries 1 along the width direction W. In addition, each notch N on the lower side of the plate body 21 in the height direction H corresponds to the location of the gap between every two adjacent batteries 1. Each flange F on the lower side of the plate body 21 in the height direction H bends from a thickness-wise side edge N1 of a corresponding notch N toward the plurality of batteries 1 along the width direction W. Moreover, each notch N in the middle part between the upper side and the lower side of the plate body 21 in the height direction H corresponds to the location of the gap between every two adjacent batteries 1. Each flange F in the middle part between the upper side and the lower side of the plate body 21 in the height direction H bends from a thickness-wise side edge N1 of a corresponding notch N toward the plurality of batteries 1 along the width direction W. In other embodiments, a plurality of notches N and a plurality of flanges F may also be formed merely in the middle part between the upper side and the lower side of the plate body 21 in the height direction H. Alternatively, a plurality of notches N and a plurality of flanges F may also be formed in another position between the upper side and the lower side of the plate body 21 in the height direction H. Each notch N in the other position between the upper side and the lower side of the plate body 21 in the height direction H corresponds to the location of the gap between every two adjacent batteries 1. Each flange F in the other position between the upper side and the lower side of the plate body 21 in the height direction H bends from a thickness-wise side edge N1 of a corresponding notch N toward the plurality of batteries 1 along the width direction W.

In the foregoing embodiments, when the thickness of the first side plate 2 is smaller than the width of the gap between two adjacent batteries 1, a bulging rib F1 that bulges in the thickness direction T is formed on each flange F. The bulging rib F1 is approximately parallel to the thickness-wise side edge N1 of the corresponding notch N, and is configured to adjust the gap between two adjacent batteries 1. The bulging rib F1 is stamped into a shape that is convex on one side and concave on the other side, and can bulge toward any direction as long as a thickness in the thickness direction T is formed. The bulging rib F1 formed by stamping is characterized by high precision, convenience to operate, and cost-efficiency.

In the embodiment in which a plurality of notches N and a plurality of flanges F are formed on both the upper side and the lower side of the first side plate 2 in the height direction (H), a bulging direction of the bulging rib F1 on each flange F on the upper side of the first side plate 2 in the height direction H is opposite to a bulging direction of the bulging rib F1 on each flange F on the lower side of the first side plate 2 in the height direction H. In this way, opposite forces that abut against each battery 1 are exerted on the battery 1 from two sides of the battery 1, and more space is reserved for expansion of the battery 1. The upper side of the first side plate 2 in the height direction H, when the first side plate 2 includes an upper bending portion 22, means the upper bending portion 22 of the first side plate 2, as in the first embodiment shown in FIG. 5 and the fifth embodiment shown in FIG. 13; and, when the first side plate 2 includes no upper bending portion 22, means the upper side of the plate body 21 of the first side plate 2, as in the fourth embodiment shown in FIG. 12 and the ninth embodiment shown in FIG. 17. The lower side of the first side plate 2 in the height direction H, when the first side plate 2 includes a lower bending portion 23, means the lower bending portion 23 of the first side plate 2, as in the fourth embodiment shown in FIG. 12 and the fifth embodiment shown in FIG. 13; and, when the first side plate 2 includes no lower bending portion 23, means the lower side of the plate body 21 of the first side plate 2, as in the first embodiment shown in FIG. 5, the sixth embodiment shown in FIG. 14, and the ninth embodiment shown in FIG. 17. The second side plate 3 may adopt any structure of the first side plate 2 according to the foregoing embodiments, and has a shape identical to that of the first side plate 2, and therefore, the corresponding schematic diagram and description are omitted.

Two ends of the plate body 21 of the first side plate 2 in the thickness direction T are fixed to the corresponding two ends of the two end plates 4 in the width direction W by welding. Further, as shown in FIG. 1 and FIG. 3, the first side plate 2 may further include end bending portions 24 extending from the two ends of the plate body 21 in the thickness direction T toward the plurality of batteries 1 along the width direction W. Each end bending portion 24 of the first side plate 2 is fixed to an end of the corresponding end plate 4 in the width direction W by welding. The second side plate 3 may also be fixed and welded to the end plate 4 in the same way as the first side plate 2, so as to strengthen overall rigidity of a battery module frame that includes the first side plate 2, the second side plate 3, and the end plates 6.

In conclusion, in the battery module according to this application, two adjacent batteries 1 are separated by a plurality of notches N and a plurality of flanges F formed on the first side plate 2, thereby reserving more space for expansion of each battery 1, simplifying an assembly process of the battery module, and reducing costs.

Although a plurality of exemplary embodiments are described above, this disclosure is not limited to the explicitly disclosed combinations. Therefore, unless otherwise specified herein, the features disclosed herein may be combined together variously. For brevity, other combinations are not described herein.

The foregoing descriptions are merely exemplary embodiments of this application, but are not intended to limit this application. A person skilled in the art understands that this application may have various modifications and variations. Any modification, equivalent replacement, improvement, and the like made without departing from the spirit and principles of this application fall within the protection scope of this application.

What is claimed is:

1. A battery module, wherein the battery module comprises:
    a plurality of batteries, arranged sequentially along a thickness direction of the battery module, wherein a gap exists between every two adjacent batteries; and
    a first side plate, disposed on one side of the plurality of batteries in a width direction of the battery module, wherein
    a plurality of notches and a plurality of flanges are formed on the first side plate, each notch corresponds to a location of the gap between every two adjacent batteries, and each flange bends from one side of a corresponding notch and extends into the corresponding gap between the two adjacent batteries to separate the two adjacent batteries,
    wherein a thickness of the first side plate is smaller than a width of the gap between two adjacent batteries,
    wherein a bulging rib that bulges in the thickness direction is formed on each flange,
    wherein the bulging rib is parallel to the thickness-wise side edge of the corresponding notch.

2. The battery module according to claim 1, wherein the first side plate comprises a plate body and an upper bending portion, the upper bending portion bends from an upper side of the plate body toward the plurality of batteries along the width direction, the upper bending portion is located on an upper side of the plurality of batteries in a height direction of the battery module, a plurality of notches and a plurality of flanges are formed on the upper bending portion, each notch of the upper bending portion corresponds to the location of the gap between every two adjacent batteries, and each flange of the upper bending portion bends downward from a thickness-wise side edge of a corresponding notch.

3. The battery module according to claim 1, wherein the first side plate comprises a plate body and a lower bending portion, the lower bending portion bends from a lower side of the plate body toward the plurality of batteries along the width direction, the lower bending portion is located on a lower side of the plurality of batteries in a height direction of the battery module, a plurality of notches and a plurality of flanges are formed on the lower bending portion, each notch of the lower bending portion corresponds to the location of the gap between every two adjacent batteries, and each flange of the lower bending portion bends upward from a thickness-wise side edge of a corresponding notch.

4. The battery module according to claim 1, wherein the first side plate comprises a plate body, a plurality of notches and a plurality of flanges are formed on at least one of an upper side, a lower side, or a position between the upper side and the lower side of the plate body in the height direction, each notch on at least one of the upper side, the lower side, or the position between the upper side and the lower side of the plate body in the height direction corresponds to the location of the gap between every two adjacent batteries, and each flange at the corresponding position bends from a thickness-wise side edge of a corresponding notch toward the plurality of batteries along the width direction.

5. The battery module according to claim 1, wherein a plurality of notches and a plurality of flanges are formed on an upper side and a lower side of the first side plate separately in the height direction, and a bulging direction of the bulging rib on each flange on the upper side of the first side plate in the height direction is opposite to a bulging direction of the bulging rib on each flange on the lower side of the first side plate in the height direction.

6. The battery module according to claim 1, further comprising a second side plate, wherein the second side plate adopts a structure of the first side plate according to claim 1.

7. The battery module according to claim 6, wherein a shape of the second side plate is identical to that of the first side plate.

* * * * *